United States Patent
Drawsky

[15] 3,680,530
[45] Aug. 1, 1972

[54] SLOTTED FLOORING

[72] Inventor: Ronald H. Drawsky, Walnut Creek, Calif.

[73] Assignee: Kaiser Aluminum & Chemical Corporation, Oakland, Calif.

[22] Filed: Jan. 29, 1971

[21] Appl. No.: 111,021

[52] U.S. Cl. .......................119/28, 52/586, 52/588, 119/16
[51] Int. Cl. .............................................A01k 01/00
[58] Field of Search ......119/16, 20, 28; 52/586, 588, 52/536, 364

[56] References Cited

UNITED STATES PATENTS

| 747,239 | 12/1903 | Schmidt | 119/28 |
| 874,674 | 12/1907 | Grunewald et al | 119/28 |
| 2,814,999 | 12/1957 | Reeves | 52/588 X |
| 3,230,931 | 1/1966 | Taylor et al | 118/28 |
| 3,528,391 | 9/1970 | Johnson | 119/28 |

Primary Examiner—Samuel Koren
Assistant Examiner—James H. Czerwonky
Attorney—James E. Toomey, Paul E. Carlrow, Harold L. Jenkins and John S. Rhoades

[57] ABSTRACT

Improved, readily installable, strong, safe and sanitary slotted flooring for animal enclosures and the like generally comprised of channel shaped beams mounted on a support and a removable clip interconnected to adjacent channel-shaped beams for holding the beams in spaced relationship. Each beam has a longitudinally extending, outwardly opening grooved portion in each side wall and adjacent the top of the beam. The clip mates with, and removably fits within, the grooved portions of adjacent beams so as to hold beams apart. The clip is longitudinally shiftable with respect to the beams so as to define a waste discharge opening of adjustable size therebetween whereby the flooring can be readily cleaned of waste, debris, etc., with minimal disturbance of the animals occupying the enclosures.

11 Claims, 5 Drawing Figures

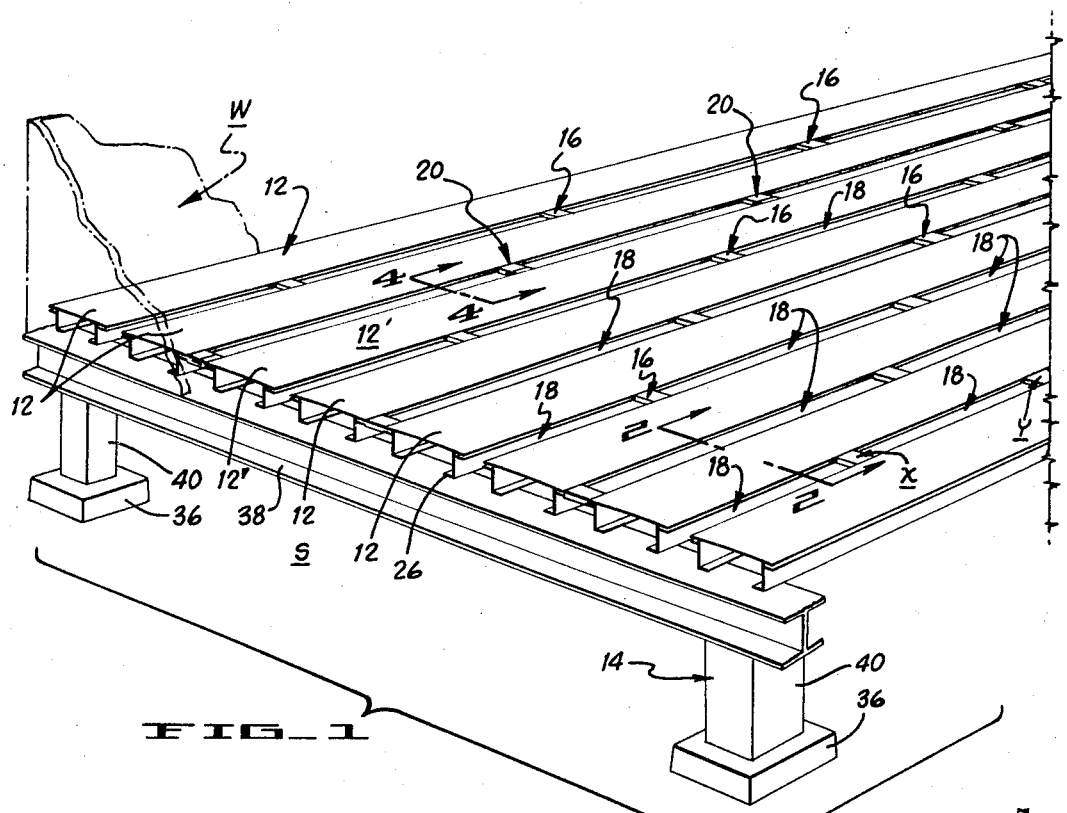
FIG_1
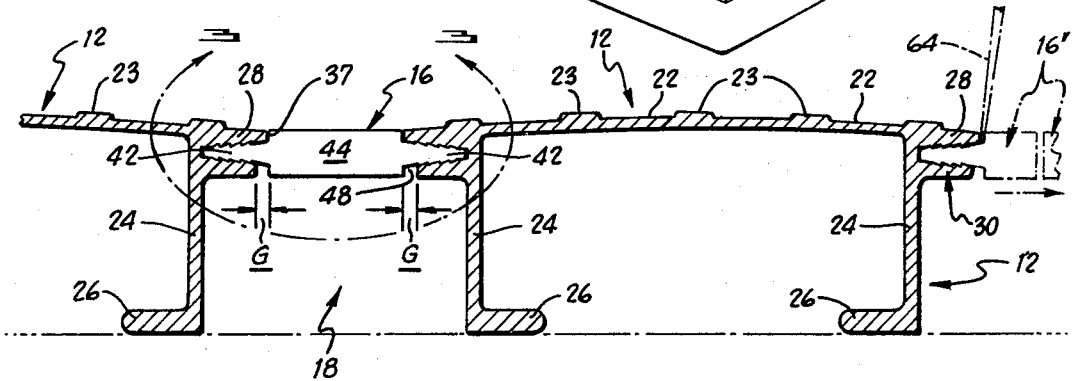
FIG_2
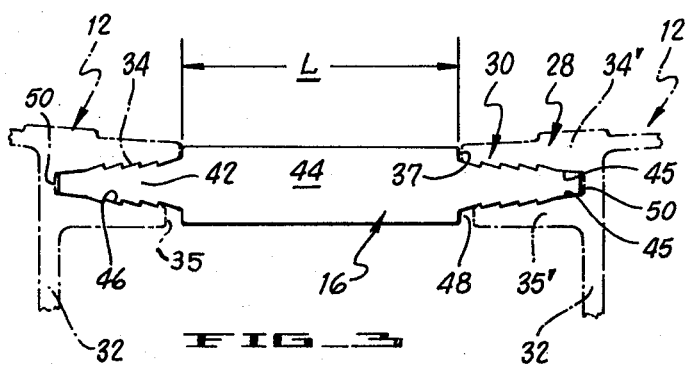
FIG_3
RONALD H. DRAWSKY
INVENTOR.
BY John S. Rhoades
ATTORNEY

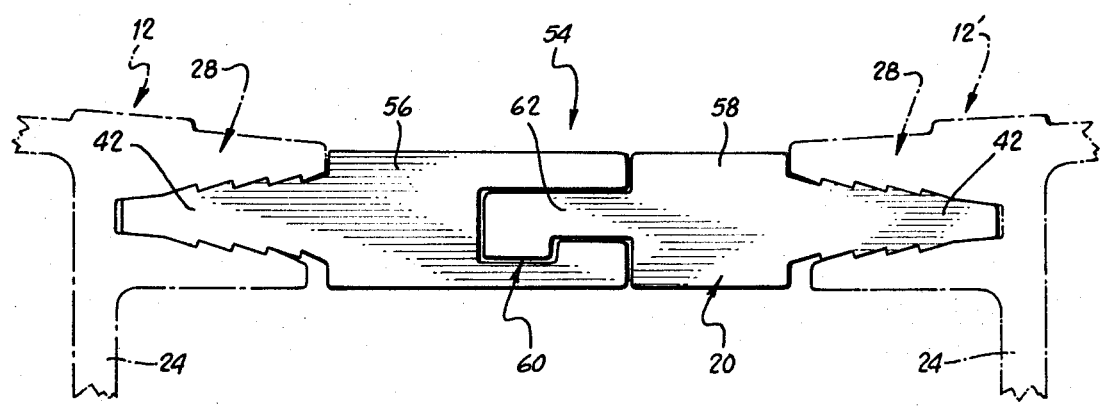
FIG_4
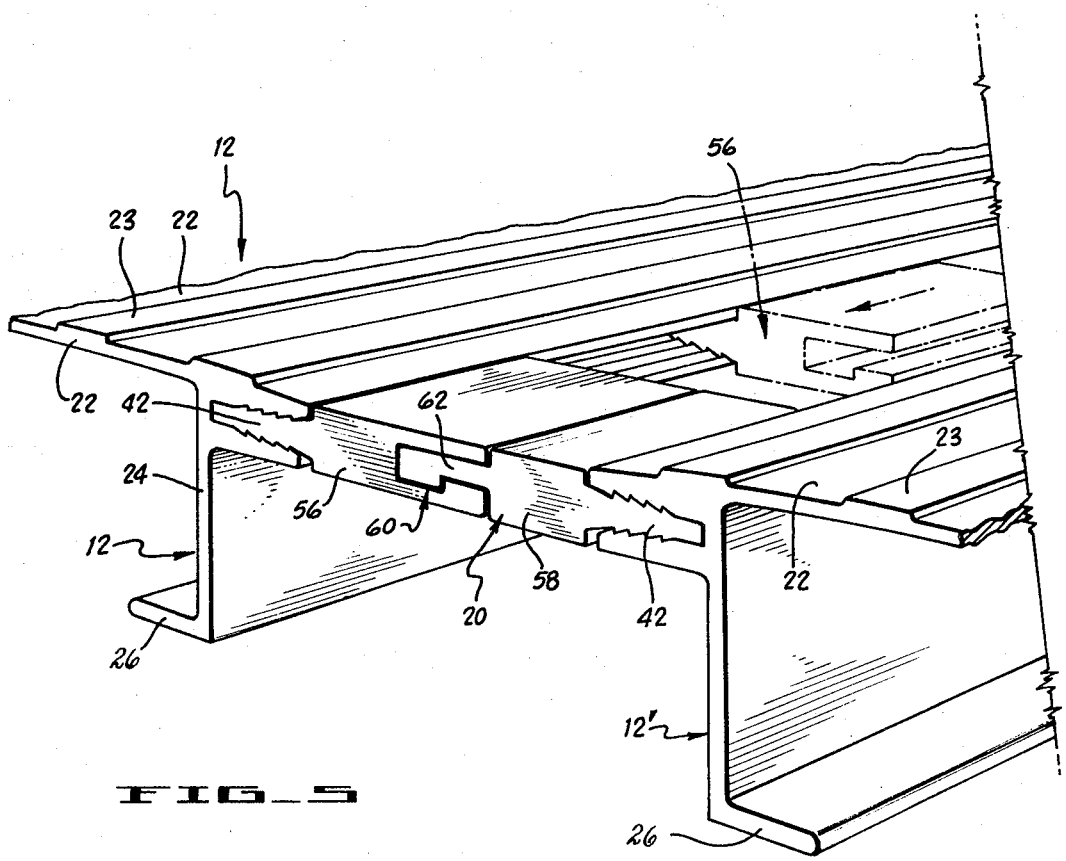
FIG_5
Ronald H. Drawsky
INVENTOR.
BY John S. Rhoades
ATTORNEY

SLOTTED FLOORING

BACKGROUND OF THE INSTANT INVENTION

This invention relates to flooring. More particularly, it relates to improved slotted flooring for animal enclosures and the like.

Earlier floorings for animal enclosures are exemplified by U.S. Pat. No. 3,230,931 to Taylor et al granted Jan. 25, 1966, and U.S. Pat. No. 3,528,391 to Johnson granted Sept. 15, 1970. These prior floorings are generally not adapted for quick installation, easy servicing, simplified disassembly, or ready cleaning.

The improved flooring of the instant invention is generally comprised of a plurality of channel shaped beams mounted upon a support. Improved clips are used for interconnecting adjacent beams in spaced relationship so as to define a number of grate-type openings of a predetermined size between the adjacent and opposed longitudinal edges of the clip-connected beams. Since the clip and beams cooperate to define openings of a predetermined size, the flooring elements of the instant invention can be selectively arranged and spaced to support various kinds and sizes of animals without injury thereto such as, e.g., by preventing entrapment of an animal hoof in an opening between adjoining beams.

SUMMARY OF THE INSTANT INVENTION

A primary purpose of the instant invention is to provide an improved readily assembled and repairable slotted flooring for animal enclosures and the like. The flooring is generally comprised of a plurality of channel shaped beams and removable clips interconnected to adjacent side walls of the beams for holding the beams in a selected spaced relationship. The clips are longitudinally shiftable with respect to the clip-interconnected beams in order to define a number of grate-type openings of predetermined size between beams. The beams and clips are preferably made from aluminum alloy extrusions.

A given beam can include a side wall flange for stiffening and reinforcing the same. The top side of a beam preferably has a convex shape in transverse section and can include an upstanding rib, if desired.

A clip can be a one-piece or multi-piece element comprised of interlockable and disconnectable parts for facilitating connection of adjacent beams especially during removal and replacement of a beam after the metal flooring has been installed.

Although the slotted flooring of the instant invention is particularly useful for supporting animals such as hogs and will be described with particular reference thereto, it is not intended to be limited to such uses.

BRIEF DESCRIPTION OF THE DRAWINGS

FIG. 1 is a fragmentary perspective view of a preferred embodiment of the hog pen flooring of the instant invention;

FIG. 2 is an enlarged cross-sectional view taken along line 2—2 of FIG. 1 and with parts added;

FIG. 3 is an enlarged elevational view within the bounds of line 3—3 of FIG. 2;

FIG. 4 is another enlarged cross-sectional view taken along line 4—4 of FIG. 1 and illustrates a slightly modified form of the clip of the instant invention; and FIG. 5 is a fragmentary perspective view of the flooring of the invention and illustrates in dotted and solid lines more than one operative position of the modified clip of FIG. 4.

DETAILED DESCRIPTION

With further reference to the drawings and particularly FIGS. 1-3 a preferred embodiment of slotted flooring 10 is illustrated for supporting a hog (not shown) in a safe and sanitary manner. The flooring is generally comprised of a plurality of channel shaped beams 12 and an upstanding support 14 for supporting the opposed ends of the beams in spaced relation to an underlying surface $\underline{S}$ which can be concrete. The flooring includes a series of load bearing and load transfer clips 16 extending between and removably interconnected to adjacent beams 12 so as to hold the interconnected beams in spaced relationship when they are mounted on the support. As will be more apparent hereinafter, the adjoining beams together with the clips define a plurality of grate-type openings 18 of adjustable size. The clips 16 and beams 12 are preferably made up of light weight aluminum alloy extrusions or other suitable materials. In a slightly modified form of the instant invention, the flooring 10 can have one or more two-piece clips incorporated therein for interconnecting and holding a replacement beam 12' or regular beam 12 in spaced relation to an adjacent beam 12 all as indicated in FIGS. 1 and 4-5.

In an advantageous embodiment of the invention, each channel shaped beam 12 preferably has a web 22 of outwardly convex configuration in transverse section as indicated in FIGS. 1-2. The convex side of beam web 22 can be provided with one or more upstanding, longitudinally extending and parallel, spaced reinforcing ribs 23.

Opposed side walls 24 of a given beam 12 depend from the concave side of web 22 and are disposed in parallel spaced relation to each other. An opposed side wall 24 is disposed at about 90° relative to the respective beam web and is advantageously offset laterally inward of the associated side edge thereof. If desired, an inwardly directed reinforcing foot flange 26 can be provided at the lower edge of a side wall 24 of the beam 12 in the manner illustrated in FIGS. 1-2 and 5.

A longitudinally extending and laterally projecting grooved seat element 28 is preferably provided at the area of intersection between a side wall 24 and web 22 of a given beam 12. Seat element 28 can extend for substantially the full length of a beam 12. Groove 30 of seat 28 projects inwardly and approximates a barbed arrow in cross section whereby the upper and lower surface sections 34' and 35' of groove 30 are provided with an opposed series of serrations or teeth 34 that substantially fully extend between the ends of the grooved element and taper or slope downwardly and inwardly. For reasons that will become more apparent hereinafter, the outer side edge 35 of the bottom or lower section 35' of a grooved seat 28 is offset laterally inward of the outer side edge 37 of the top section thereof, as indicated in FIGS. 2–3.

Beams 12 extend between opposed upstanding supports 14, only one of which is shown for the sake of brevity in FIG. 1. A support 14 generally includes a pair of piers 36 mounted on a surface $\underline{S}$ such as, concrete and an I-shaped cross rail 38 affixed to columns 40 that extend upwardly from the piers 36 in the manner depicted in FIG. 1. Flanges 26 of beams 12 rest on the upper flange of the associated rail 38 of support 14. One or more beams 12 can be anchored to support 14 by means of fasteners driven through flanges 26 of a beam 12 and a support rail flange in conventional fashion.

As somewhat schematically indicated in dotted lines in FIG. 1, a wall $\underline{W}$ can enclose the outer perimeter of the floor formed by beams 12 for confining a hog without the danger of the hog accidentally or otherwise falling off of the flooring during use thereof.

Another advantageous embodiment of flooring 10 of the instant invention involves use of one-piece clips 16. Each clip 16 is of generally rectangular shape in transverse section with the side edges comprising reduced and opposed sections 42 and an enlarged intermediate portion 44 interconnected thereto. Top and bottom surfaces 45 of a reduced clip side section 42 converge towards each other in an outward direction to define a bayonet-type or tapered reduced side section 42. Surfaces 45 are provided with serrations 46 that are complementary to the longitudinally serrated edges 34 of a seat 28 of a beam 12 as aforedescribed. A shoulder 48 joins the intermediate clip portion 44 with the inner end of a convergent clip top or bottom surface 45 indicated in FIGS. 2–3.

A clip 16 has a width substantially less than the length of a beam 12 as indicated in FIG. 1. The length $\underline{L}$ of clip 16 from shoulder to shoulder 48–48 defines the minimal width of an opening 18 between the upper side edge portions 37 of adjacent beams 12 as shown in FIGS. 2–3. A reduced end 42 of a clip 16 between its outer end face 50 and a shoulder 48 has a length that is less than the depth of a groove 30 in the beam seat in order to assure tight interlocking engagement between the reduced end of a clip 16 and the grooved element 28 of the associated beam 12 upon connecting the clip to the beam during installation of the flooring of the instant invention.

In an operative embodiment of the instant invention flooring 10 can be installed as an integral part of an animal enclosure, as will now be described. It is to be understood, however, that the flooring could be installed in various ways other than the manner to be described. Upon installing several upstanding supports 14, a plurality of beams 12 of appropriate length are normally individually emplaced in side-by-side relation to span the opposed rails 38 of the supports as illustrated in FIG. 1.

Assuming that the beams are emplaced from right to left between and across opposed support rails 38 and assuming that a series of clips 16 is to be used between adjacent beams, the reduced end 42 of a first clip 16 of a pair of clips is forceably driven, by an ordinary hammer or the like into the groove of the left-hand grooved seat 28 of a right-hand endmost beam 12 say at the preselected point $\underline{X}$ indicated in FIG. 1. The reduced end of this first clip 16 is forced forward until its upper shoulder 48 abuts side edge portion 37 of the upper section of the left-hand grooved element 28 of the right-hand beam as indicated in FIGS. 2–3. Such abutment assures that opposed serrated edges 46 of the one reduced end 42 of first clip have been driven home and into relatively tight and substantially fully mating and interlocking engagement with the opposed serrated edge portions 34 of the left-hand grooved seat 28 of the aforementioned right-hand beam at point $\underline{X}$. Upon abutment between clip shoulder 48 and right-hand beam side edge portion 37, the lower shoulder 48 of the clip still remain separated from the lower side edge portion 35 of the left-hand grooved element by way of a gap $\underline{G}$ indicated in FIG. 2. With the first clip in place a second clip 16 is interfitted at one reduced end within the left-hand grooved seat 28 of right-hand beam 12 at another preselected location $\underline{Y}$ along the seat in a similar fashion to the first clip.

After these first and second clips have been fitted within the right-hand beam groove as aforedescribed the opposed free reduced ends of these clips 16 are left to be fitted within the opposing grooved seat 28 of the adjacent beam 12. Thus when the opposing grooved seats 28 of the two adjacent beams 12 are aligned and with an end portion of the clip 16 securely anchored in one of the grooved seats 28 of one beam, the other free end portion of the clip 16 can be forced into the opposing seat 28 of the other beam by hammering on either beam so as to force the two beams together. It is understood, of course, that during this time the beam not being subjected to hammering will be rigidly locked to I-beams 38 by way of appropriate fasteners (not shown). After all of the beams 12 of flooring 10, have been clipped together a rigid flooring will be provided and supported by the raised I-beams 38.

Since each clip 16 is of the same dimensions with the usual tolerances as another clip 16 a pair of such clips will rigidly secure adjacent beams together in the parallel spaced relation indicated in FIG. 1. When a pair of clips 16 are interconnected to beams 12 as many as three grate-type openings 18 of predetermined size can be set up between the beams. Each opening has a fixed width corresponding to the length of an intermediate portion 44 of a given clip 16 but an adjustable length. If desired an intermediate opening between a pair of clips 16 and between adjacent beams 12 can be made smaller or larger than the opposed endmost openings between the beams either by appropriately selecting the initial points of clip interconnection or by impact adjustment of a clip after it is laterally interlocked, as aforedescribed.

If desired, and as further indicated in FIG. 1, clip 16 of a series of clips of flooring 10 can be disposed and offset in longitudinally staggered relationship to clips 16 in an adjacent series. Depending on the length of beams 12 and/or the individual loads being carried by the beams more than two clips may be required or used to hold the beams together between opposed support rails.

Since a flooring opening 18 widthwise generally corresponds to the length $\underline{L}$ of the intermediate portion of a clip 16 the width of the opening can be controlled by providing clips 16 having the appropriate length $\underline{L}$ for portion 44. Openings 18 can be expanded widthwise for accommodating a hog in various stages of growth and activity, for instance, weaning, farrowing, etc., without danger of injury to the hog by entrapment of a hoof in an oversized floor opening.

The depth of a shoulder 48 of a clip 16 substantially corresponds to the thickness of the upper side edge portion 37 of a grooved seat element 28. When the upper shoulder 48 of a given clip 16 at a reduced end thereof abuts its associated upper side edge portion 37 of the grooved element of a beam 12 during connection of the reduced end of the given clip to its respective beam, the top surface of intermediate clip portion 44 merges in effect with the adjacent upper surface portion of the web of the respective beam and effects a smooth extension or transition of the upper web surface of the beam to the clip and vice versa as illustrated in FIGS. 2-3. This means that a hog can normally move from beam to beam of the flooring without the danger of injury by tripping on a clip. The upstanding ribs 23 provided on the convex upper side of beam web 22 advantageously form a non-skid hoof engaging surface that helps to prevent the hog from slipping on the beam.

In addition to being relatively safe the present flooring is sanitary in that it enables quick and effective removal of hog waste and other foreign debris that might otherwise subject the confined hogs to an excessive amount of disease-bearing bacteria. The flooring is readily cleaned of waste debris by hosing down the flooring and flushing the debris through the openings.

The convex shape of the upper web surface of a beam forces animal waste and other debris toward the openings between beams. Upper clip shoulder 48 and the adjacent upper side edge portion 37 of a grooved element 28 are usually in tight abutting engagement whereby animal waste and debris will not tend to collect between the upper shoulder 48 of the clip and the associated upper side edge portion 37, thereby greatly minimizing corrosive attack of the clip and other flooring elements. Tight abutment of upper clip shoulder 48 is assured in view of the gap G between the lower shoulder 48 of a clip 16 and the adjacent lower side edge portion 35 of the grooved element 28. The vertical dependency of a side wall 24 from the web of a beam 12 and the lateral offsetness of the side wall of the beam in a direction inwardly of the adjacent grooved element 28 thereof assures maximum waste runoff without excessive collection between adjacent exterior surfaces 32 of side walls 24 of adjoining beams 12 during use of flooring 10. Foot flanges 26 are directed inwardly away from openings 18 so as not to present obstacles to waste runoff, etc.

In another advantageous embodiment of the instant invention, a two-piece clip 20 can be used instead of a one-piece clip 16 for interconnecting the beams 12 as depicted in FIGS. 4-5. It is to be understood that like parts of clips 16 and 20 of flooring 10, etc. have corresponding reference numerals unless otherwise specified. A clip 20 is comprised of an enlarged intermediate portion 54 having selectively interconnectable female and male elements 56 and 58 respectively. Inner end of female element 56 has an L-shaped groove 60 extending transversely thereof. Adjacent inner end of male element 58 has an outwardly projecting tongue 62 of L-shaped configuration complementary to the shape of groove 60 of female element 56. As is apparent in FIGS. 1-2 and 4-5, the intermediate portion of clip 20 preferably has a length corresponding to the length of a clip 16.

If for any reason a beam 12 must be removed between beams 12 of flooring 10 after the flooring has been installed such as, e.g., due to bending of the given beam, each clip 16' of both series of clips disposed on opposite sides of and connected to the given beam 12 to be removed is severed in conventional fashion by a tool such as an ordinary hack saw (not shown) as indicated by dotted lines in FIG. 2.

The remaining and retained severed portion of a clip 16' disposed in the groove of the adjacent grooved element of a beam 12 may be removed by forceably inserting in appropriate fashion a pry-out tool 64, such as an ordinary screwdriver or chisel between the retained clip portion and the adjacent side section of the associated grooved element 28 as indicated in dotted lines in FIG. 2. Forceably inserting the tool in this fashion causes the severed portion of a remaining clip to be forced out of the groove of the associated grooved element. If for some reason the grooved element portion of a beam is excessively distorted in removing a clip 16' the distorted grooved element portion can be straightened by an ordinary hammer, etc. In certain circumstances, a clip 16 or 16', e.g., instead of being severed can be disconnected from adjoining beams by merely shifting the clip longitudinally of adjoining beams associated therewith until the clip is fully advanced beyond the adjacent longitudinal ends of the adjoining beams. Hence, clips 16' associated with a beam 12 that must be removed can be readily disconnected without disturbing other beams 12, etc., of flooring prior to installation of a replacement beam 12', as will now be described.

Before insertion of the replacement beam 12' between adjoining beams 12, the reduced end 42 of the male element 58 of a given clip 20 is preferably affixed to the grooved element of replacement beam 12' on one side thereof, as indicated in FIGS. 1 and 4-5. Similarly, the reduced end 42 of the female element 56 of a given clip is affixed to the adjacent grooved element of the adjacent beam 12 on the opposed side thereof. In affixing the reduced end of the female element of a given clip 20 it is preferably disposed in longitudinally offset relationship to the male element 58 of the given clip thereby enabling quick emplacement of beam 12' between adjacent beams 12. During emplacement of beam 12' between beams 12 a series of clips 20 can be affixed to the grooved element 28 of beam 12' on the opposite side thereof and the adjacent grooved element 28 of an adjacent beam 12 as aforedescribed.

The male and female elements 58 and 56 of a given clip 20 disposed on the one side of the emplaced beam 12' can be interconnected upon forceably driving either one of the elements 56 and 58 longitudinally of the other one thereof until the tongue 62 of male element 58 of a given clip 20 is fully inserted in the groove of the female element 56 thereof so as to form a fully assembled clip 20 as indicated in FIGS. 4-5. Thus a series of clips 20 advantageously enable replacement of a beam 12' between adjacent beams 12 during use of flooring 10 of the instant invention.

Depending upon the use of flooring 10 beams 12 can be made of other material besides aluminum such as a suitable grade of steel, etc. Another use for flooring 10 is as a grate device for sorting granular-type materials. In certain instances one clip 16 or 20 may be required for interconnecting adjoining beams. Although clip 20 has been described in connection with the replacement of a beam 12 between adjoining beams it is not to be limited thereto but could be used, if desired, during initial installation of flooring 10 of the instant invention. Although grooved element 28 of a beam 12 has been disposed at the area of intersection between a side wall 24 of the beam and the web thereof it could be disposed at any suitable location between the opposed edges of the side wall of a beam.

Advantageous embodiments of the flooring of the instant invention have been shown and described. It is obvious that various changes and modifications may be made therein without departing from the appended claims, wherein:

WHAT IS CLAIMED IS:

1. A slotted metal floor for an animal enclosure and the like said floor comprising a support and a plurality of floor beams arranged in generally parallel and spaced relation on said support, each floor beam being comprised of interconnected web and side walls whereby a beam has an approximately inverted channel-shaped configuration in transverse section, at least one of said beams having a longitudinally extending grooved portion disposed in a side wall thereof adjacent the top of the beam the groove of which opens outwardly in the direction of an adjacent beam and at least one clip element portions of which mate with and removably fit within the said groove of the said one beam and a similar groove of an adjacent beam so as to hold the beams apart and divide the space between adjacent side walls of adjacent beams into a plurality of grate-type openings of predetermined size.

2. A slotted metal floor as set forth in claim 1, wherein the portions of the clip element that are located outside of said grooves are flush with the top of each beam to which it is attached.

3. A slotted metal floor as set forth in claim 1 in which the exterior surface of the web of the one beam is of convex arcuate shape in transverse section.

4. A slotted metal floor as set forth in claim 1 in which the exterior surface of the web of the one beam is provided with an upstanding rib.

5. A slotted metal floor as set forth in claim 1 in which the grooved portion of the one beam is located in the area of intersection between the web of the beam and the side wall thereof.

6. A slotted metal floor as set forth in claim 1 in which the outer and opposed side edges of a grooved portion disposed on opposite sides of the groove thereof are laterally offset relative to each other.

7. A slotted metal floor as set forth in claim 1 in which a side wall of a given beam is provided with a flange for reinforcing the same.

8. A slotted metal floor as set forth in claim 1 wherein the portions of the clip element that fit within the grooves of the beams are tapered.

9. A slotted metal floor as set forth in claim 1 wherein the portion of a clip element that fits within a groove has serrations and the groove in which it fits is also provided with complementary serrations.

10. A slotted metal floor as set forth in claim 1 in which the said clip element includes means for abuttingly engaging the grooved portion of a side wall of a beam upon insertion of an end of said clip element in the groove of the grooved portion of the side wall thereof.

11. A slotted metal floor as set forth in claim 1 in which said clip element is comprised of interlockable elements.

* * * * *